(12) United States Patent
Allan

(10) Patent No.: US 9,629,486 B2
(45) Date of Patent: Apr. 25, 2017

(54) APPARATUS FOR CREATING DECORATIVE FLORAL ARRANGEMENTS INCORPORATING CUT FLOWERS WITH STEMS TAKEN FROM LIVING PLANTS

(71) Applicant: Rhonda Allan, San Gabriel, CA (US)

(72) Inventor: Rhonda Allan, San Gabriel, CA (US)

( * ) Notice: Subject to any disclaimer, the term of this patent is extended or adjusted under 35 U.S.C. 154(b) by 0 days.

(21) Appl. No.: 14/629,368

(22) Filed: Feb. 23, 2015

(65) Prior Publication Data

US 2016/0242579 A1    Aug. 25, 2016

(51) Int. Cl.
  *A47G 7/02*      (2006.01)
  *A01G 5/04*      (2006.01)
  *A47G 7/03*      (2006.01)

(52) U.S. Cl.
  CPC ............. *A47G 7/02* (2013.01); *A01G 5/04* (2013.01); *A47G 7/03* (2013.01)

(58) Field of Classification Search
  CPC ... A47G 7/00; A47G 7/02; A47G 7/03; A01G 5/00
  See application file for complete search history.

(56) References Cited

U.S. PATENT DOCUMENTS

| | | | | |
|---|---|---|---|---|
| 903,227 A | * | 11/1908 | Pruden | A47G 7/00 206/216 |
| 1,775,250 A | * | 9/1930 | Link | A47G 7/07 428/23 |
| 1,868,802 A | * | 7/1932 | Okai | A47G 7/03 47/41.13 |
| 2,333,561 A | * | 11/1943 | Hamblin | A47G 7/03 47/41.13 |
| D145,868 S | * | 11/1946 | Fletcher | 428/23 |
| 2,981,033 A | * | 4/1961 | Cheetwood | A01G 5/00 428/23 |
| 3,144,932 A | | 8/1964 | Zerbo, Jr. | |
| 3,243,895 A | | 4/1966 | Girard | |
| 3,477,175 A | * | 11/1969 | Sakamato | A47G 7/03 220/605 |
| 3,745,702 A | * | 7/1973 | Ogawa | A47G 7/07 211/60.1 |
| 4,600,612 A | * | 7/1986 | Litwin | A41G 1/00 156/63 |
| 4,606,950 A | * | 8/1986 | Corbet | A01G 5/04 156/63 |
| 4,937,109 A | * | 6/1990 | Lin | A01G 5/04 248/27.8 |
| 4,958,461 A | * | 9/1990 | Aldrich | A47G 7/07 47/41.01 |

(Continued)

*Primary Examiner* — Monica Williams
*Assistant Examiner* — Michael Wang
(74) *Attorney, Agent, or Firm* — Thomas I. Rozsa

(57) ABSTRACT

An apparatus for creating floral arrangements by having a structure where the structure has specific locations such as openings in the structure with an insert having indicia including numbers on the insert with a respective number aligned with and visible through an aligned opening in the structure and the number corresponding with a flower and stem cut from a living plant so that the stem of the flower is inserted with the corresponding number visible through an opening in the structure so that different flowers and other floral items taken from living plants can be placed in the structure to provide a decorative floral arrangement.

15 Claims, 11 Drawing Sheets

(56) References Cited

U.S. PATENT DOCUMENTS

| | | | |
|---|---|---|---|
| 5,453,308 A * | 9/1995 | Myers | A41G 1/00 156/63 |
| 5,733,612 A | 3/1998 | Garry | |
| 5,853,827 A * | 12/1998 | Wise | A01G 5/04 248/27.8 |
| 7,562,492 B2 * | 7/2009 | Mueller | A01G 5/04 47/41.12 |
| 2003/0192958 A1 * | 10/2003 | Miyagi | A01G 5/04 239/6 |
| 2005/0074728 A1 * | 4/2005 | Dark | A01G 5/04 434/93 |

* cited by examiner

APPARATUS FOR CREATING DECORATIVE FLORAL ARRANGEMENTS INCORPORATING CUT FLOWERS WITH STEMS TAKEN FROM LIVING PLANTS

BACKGROUND OF THE INVENTION

1. Field of the Invention

The present invention relates to the field of quickly making decorative floral arrangements.

2. Description of the Prior Art

The following nine patents and published patent applications are the closest prior art known to the inventor.

1. U.S. Pat. No. 3,144,932 issued to Valerio J. Zerbo, Jr. on Aug. 18, 1964 for "Do-It-Yourself Floral Arrangement Kits" (hereafter the "Zerbo Patent");

2. U.S. Pat. No. 3,243,895 issued to Leroy M. Girard on Apr. 5, 1966 for "Kit for Making Floral Arrangements" (hereafter the "Griard Patent");

3. U.S. Pat. No. 4,600,612 issued to Robert G. Litwin et al. on Jul. 15, 1986 for "Coordinated Floral Arrangement Assembly System and Method" (hereafter the "Litwin Patent");

4. U.S. Pat. No. 4,606,950 issued to Ellen M. Corbert on Aug. 19, 1986 for "Method and Assembling a Floral Arrangement" (hereafter the "Corbert Patent");

5. U.S. Pat. No. 5,453,308 issued to William R. Meyers on Sep. 26, 1995 for "Method and System of Floral Arrangement" (hereafter the "Meyers Patent");

6. U.S. Pat. No. 5,733,612 issued to Richard Michael Garry on Mar. 31, 1998 for "Flower Arrangement Set" (hereafter the "Garry Patent");

7. U.S. Pat. No. 5,853,827 issued to Joanne T. Wise et al. on Dec. 29, 1998 for "Arranger, Crown, And Pattern for Arrangements of Decorative Items" (hereafter the "Wise Patent");

8. United States Published Patent Application No. 2005/0074728 to Mary Dark et al. on Apr. 7, 2005 for "Floral Arranging Teaching Aids and Method of Use" (hereafter the "Dark Published Patent Application");

9. U.S. Pat. No. 7,562,492 issued to Elaine Mueller on Jul. 21, 2009 for "Device and Method for Arranging Flowers" (hereafter the "Mueller Patent").

The Zerbo Patent discloses a do-it-yourself floral arrangement kit. The utilizes making floral arrangements using artificial flowers.

The Girard Patent discloses a kit for making floral arrangements. This embodies the concept of arranging flowers by a numbering pattern. However the flowers are artificial flowers and the numbers are placed upon pieces of paper that can be converted to a vertical section and horizontal section of the artificial flower arrangement.

The Litwin Patent discloses the concept of having a styrofoam base with a multiplicity of different artificial flowers which, as shown in FIG. 1, have a number such as 5 marked on the stem of the artificial flower and then there is a styrofoam base which is placed into a retaining body such as a flower pot and then the styrofoam is placed in the flower pot with numbers and the styrofoam matching the number on the stem on the flower so that the person can take the artificial flower with the number on the stem and insert the stem into the styrofoam at the location of the same number so that an arrangement of artificial flowers is created.

The Corbert Patent discloses a method for assembling a floral arrangement. The preferred embodiment includes base having an upper surface which includes a pre-designed pattern of holes adapted to receive the flowers or decorative stalks as described below.

The Myers Patent discloses a method and system of floral arrangement. Specifically, the patent discloses:

"A floral arrangement system for assembling, preparing and arranging pre-selected floral materials into a pre-selected floral arrangement includes a pattern system which includes a material list for instructing a user on obtaining pre-selected floral materials; a tool list for instructing the user on assembling tools to be used with the system; an integrated measurement means for measuring pre-selected floral materials to pre-selected lengths; an instruction means for instructing the user on preparing and arranging the materials into the preselected floral arrangement; and at least one placement pattern including pre-selected floral graphic placement pattern symbols showing the placement of each floral material."

Therefore, this is primarily artificial flowers and it is not necessarily a designation where the flowers should be placed by numbers but instead is a designation showing how the flowers should be arranged based upon a floral picture provided with the kit for arranging the flowers into a floral arrangement.

The Garry Patent deals with artificial flowers, not live flowers. The arrangement comes with a placement template as shown which basically indicates how flowers or stems of artificial flowers should be inserted into a retaining member. The flowers are placed in a mounting block as shown in FIG. 1 and then there is a template shown in FIG. 3 which has tabs on either side which is placed over the mounting block with numbers on the tabs and corresponding numbers are on the stems of the flowers so they can be inserted into the mounting block.

The Wise Patent discloses an arranger, crown, and pattern for arrangements of decorative items. In this case, there is a retention block 26 with what the inventor called a "crown" which essentially is a member 20 that is inserted over the retention member so that a multiplicity of openings is on the crown. Flowers are then inserted based on the numbering pattern in a multiplicity of openings.

The Dark Published Patent Application discloses a floral arrangement teaching aids and methods of use. The relevant portion of the patent application is the figures which show that different types of shapes have numbering systems where flowers can be inserted. The object is to teach someone how to arrange a floral arrangement in an attractive manner.

The Mueller Patent discloses a device and method for arranging flowers. The patent discloses:

"A device and method 10 for arranging flowers include a flower chart 12 for determining stem lengths for primary and secondary flower 14 and 16, a flower holder 18 for securing end portions 20 of stems 22 of the primary and secondary flowers 14 and 16, and a stem template 24 for marking portions of the flower holder 18 such that the disposition of each primary and secondary flower 14 and 16 in a flower arrangement 26, is predetermined by inserting an end portion 20 of a stem 22 of each primary and secondary flower 14 and 16 into a cooperating marked portion of the flower holder 18."

SUMMARY OF THE INVENTION

The present invention is an apparatus for creating floral arrangements by having a structure where the structure has specific locations such as openings in the structure with an insert having indicia including numbers on the insert with a respective number aligned with and visible through an aligned opening in the structure and the number corresponding with a flower and stem cut from a living plant so that the stem of the flower is inserted with the corresponding number visible through an opening in the structure so that different flowers and other floral items taken from living plants can be placed in the structure to provide a decorative floral arrangement.

It is an object of the present invention to create a floral arrangement wherein the apparatus includes a water retaining member which effectively is a bottom of a container and which is watertight and into which is inserted a water retention and stem retaining member which is more easily defined as a block of water absorbent foam which has a memory into which the stem of a cut flower is inserted into the foam and which retains the shape of the stem.

An innovation of the present invention is having an indicia assignment member which is preferably a thin sheet of material such as a thin sheet of paper with a multiplicity of indicia such as a multiplicity of numbers on the paper. By way of example, some of the numbers are the same and some of the numbers are different numbers. All of the numbers may be different or they may be subsets of different numbers. There is a cover which fits over the bottom, the cover having a multiplicity of openings which are aligned with the openings in the indicia number assignment member so that a respective indicia such as a number appears through an aligned opening.

There are also instructions which can either be on a website, on emails or other electronically delivered information or alternatively can be in print form such as an instruction book or instruction sheet, wherein the numbers are assigned to a certain flower and the flowers that are utilized are flowers with stems that are cut from living objects so that the number assigned to a specific flower is inserted through the opening in the cover and into the indicia assignment member which can be a sheet of paper which is visible through that opening and which corresponds to the number given to the specific flower and its stem. The flower is then retained in the water absorbent foam and then a multiplicity of flowers with different numbers can be inserted into different openings to generate a final floral decoration which is a beautiful quickly arranged flower arrangement having various flowers at various locations.

It is also an object of the present invention that in addition to decorative flowers, other ornaments can be inserted into the floral arrangement at any location without assignment to a number. These could include decorative bows, decorative ornaments such as something appropriate for holidays such as hearts for Valentines Day, a Santa Claus for Christmas, a Jack O'Lantern for Halloween and a bunny for Easter, as well as numerous other ornaments that are appropriate for the specific occasion.

It is also an object of the present invention to include a flower arrangement apparatus which has a multiplicity of openings on the sidewalls to receive various other decorative floral pieces such as ivy and vines to shield the cover of the container so that the entire floral arrangement appears entirely as a floral arrangement where the present invention apparatus into which the stems of the flowers have been inserted is concealed.

It is a further object of the present invention to have different indicia including numbers, and various symbols such as stars, animals etc. and also the different symbols can be different colors to designate one color being for one flower and a different color being for other flowers etc. In this embodiment, the flower and stem are assigned a certain indicia. The indicia is affixed onto the indicia assignment member so that the indicia such as a number, a letter or any other symbol is visible through the specific opening in the cover where the flower and stem with the corresponding indicia is located.

In addition, the essence of the invention is to have the cover where the indicia assignment member is visible through openings in the cover and is positioned so that the indicia assignment member is placed on top of or on at least one surface of the water retention and stem retaining member to facilitate the indicia of the indicia assignment member to be visible through aligned openings in the cover.

The bottom, while it can be in a general shape such as a round or rectangular, can also be any other shape such as a floral vase or any other desired water retaining member shape and the cover is designed to be inserted onto and retained onto the base. Where the base is round either by being a cylindrical member as shown in the drawings or where it is also in a more decorative floral arrangement, the cover can be retained by twisting onto an upper surface of the base where at least one engaging member such as a tooth on the cover engages a mating retaining protrusion on the interior of the base to retain the cover in a fixed manner. In addition, to facilitate the correct positioning of numbers of the cover relative to the numbers on the indicia assignment member, it is preferable to have the exterior teeth and internal protrusion members located at the 12 o'clock, 3 o'clock, 6 o'clock and 9 o'clock locations on the assembled base and cover.

An innovation of the present invention to have the indicia on the inserted indicia assignment member aligned with respective openings on the cover. It is also within the spirit and scope of the present invention to have the indicia on the cover adjacent a respective opening on the cover so that the cover itself can have the indicia embossed or molded thereon or embedded therein. It is also within the spirit and scope of the present invention to have embossed on or into the cover the number 12 at the 12 o'clock location, number 3 at the 3 o'clock location, the number 6 at the 6 o'clock location and the number 9 at the 9 o'clock location if the upper surface of the cover is round.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
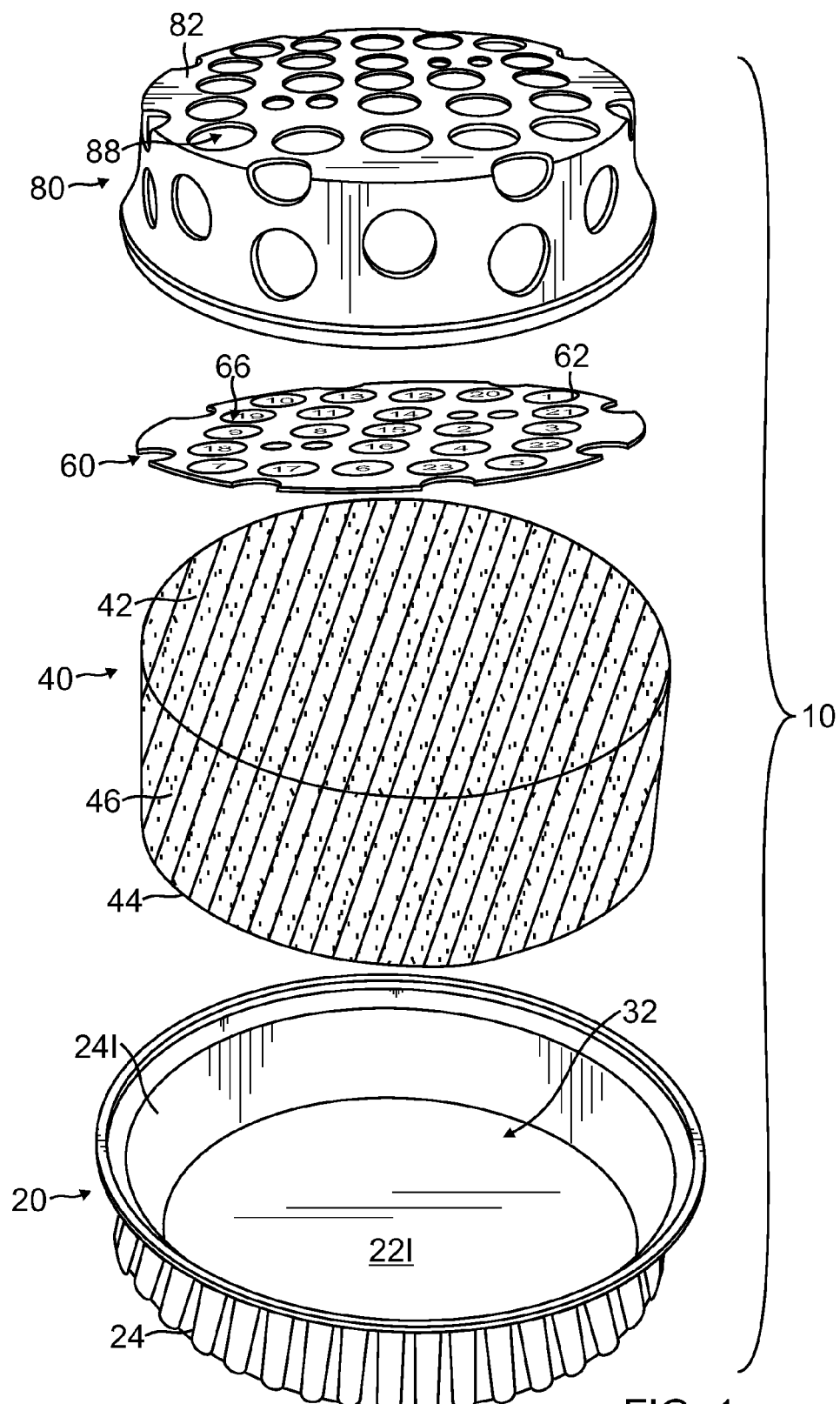
FIG. 1 is an exploded view of an embodiment of the present invention illustrating a water and retaining member, a water retention and stem retaining member, a corresponding indicia assignment member and a cover having a multiplicity of openings to enable an assigned indicia from the indicia assignment member to be visible.

FIG. 1 is an exploded view of an embodiment of the present invention apparatus for creating decorative floral arrangements 10 illustrating a water and retaining member 20, a water retention and stem retaining member 40, a corresponding indicia assignment member 60 and a cover 80 having a multiplicity of openings extending through top surface 82 to enable a respective indicia 66 which in the illustration are numbers to be visible through a respective opening 88 in the top surface 82 of the cover 80, a respective one of the multiplicity of openings extending through the cover 80. To facilitate correct placement of the indicia assignment member, an indicia marker 62 such as a circle is placed around each indicia 66.

In the illustration in FIGS. 1 to 4, the openings are in the top 84 of the cover 80, extending through the entire thickness of the cover 80 from the top surface 82 to the bottom surface 86. A general number for the openings is 88. The indicia are generally numbered 66. In the illustration in FIGS. 1 through 4, a corresponding opening 88 is aligned with and corresponding to a respective indicia 66, each respectively encircled by an indicia marker 62 as follows:

Opening 88-1 is aligned with number 10, opening 88-2 is aligned with number 19, opening 88-3 is aligned with number 9, opening 88-4 is aligned with number 18, opening 88-5 is aligned with number 7, opening 88-6 is aligned with number 13, opening 88-7 is aligned with number 11, opening 88-8 is aligned with number 8, opening 88-9 is aligned with number 17, opening 88-10 is aligned with number 12, opening 88-11 is aligned with number 14, opening 88-12 is aligned with number 15, opening 88-13 is aligned with number 16, opening 88-14 is aligned with number 6, opening 88-15 is aligned with number 20, opening 88-16 is aligned with number 2, opening 88-17 is aligned with number 4, opening 88-18 is aligned with number 23, opening 88-19 is aligned with number 1, 88-19 is aligned with number 21, opening 88-20 is aligned with number 3, opening 88-22 is aligned with number 22, and opening 88-23 is aligned with number 5.

For the embodiment illustrated in FIGS. 1 to 4, the water retaining member 20 is a container bottom having a bottom wall 22 with an interior surface 22I, and a circumferential wall 24 with an interior surface 24I which together form a cylindrical shaped container bottom surrounding an interior water tight chamber 32.

The water retention and stem retaining member 40 is a cylindrical block having a top surface 42, a bottom surface 44, and a circumferential sidewall 46. The water retention and stem retaining member 40 is preferably made of water absorbing foam which is also known as an oasis. The foam has a memory so that when a stalk of a flower is caused to penetrate into the foam, the foam retains the stalk and the opening remains even if the stalk is removed.

Figure 2:
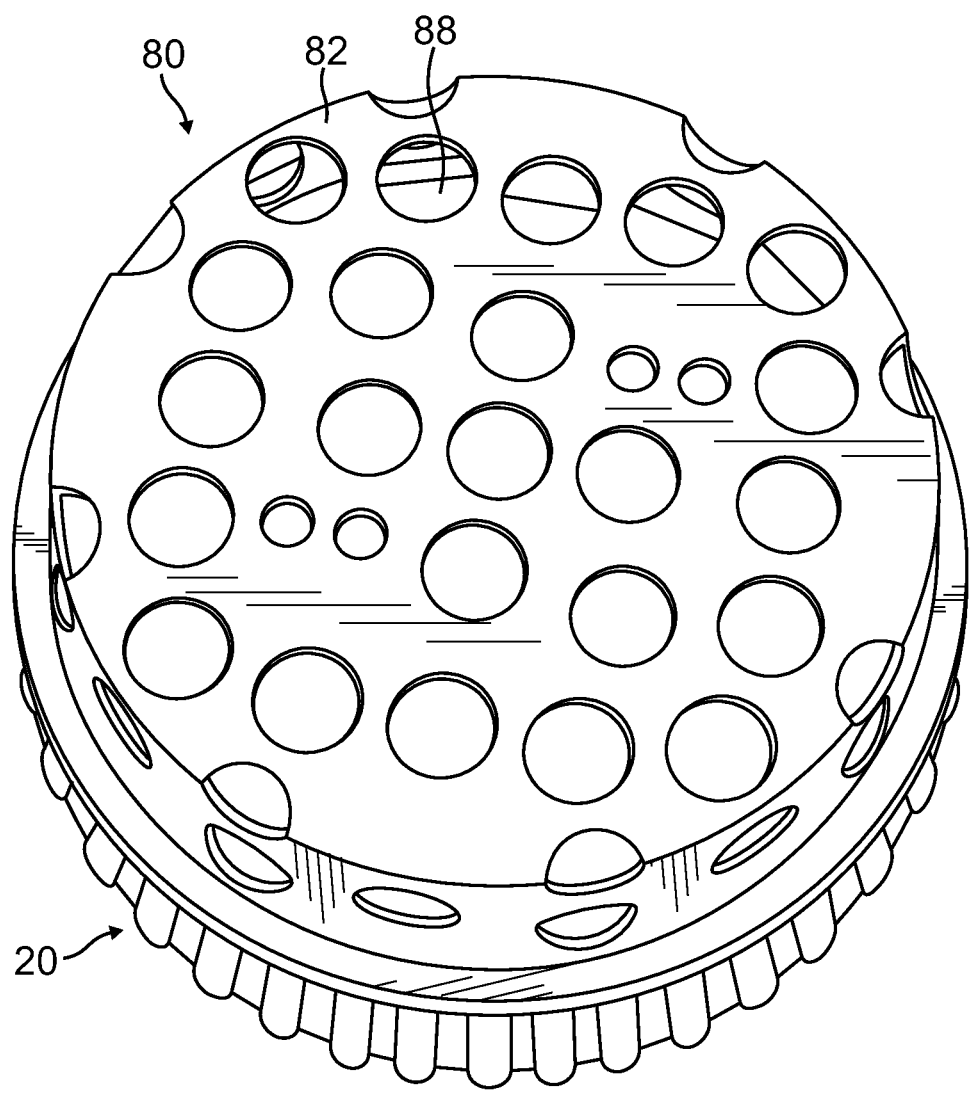
FIG. 2 is a top perspective view of a cover of an embodiment with a multiplicity of openings extending through surfaces of the cover.

Referring to FIG. 2, there is illustrated a top perspective view of the assembled apparatus 10 illustrating cover 80 with a multiplicity of openings 88.

Figure 3:
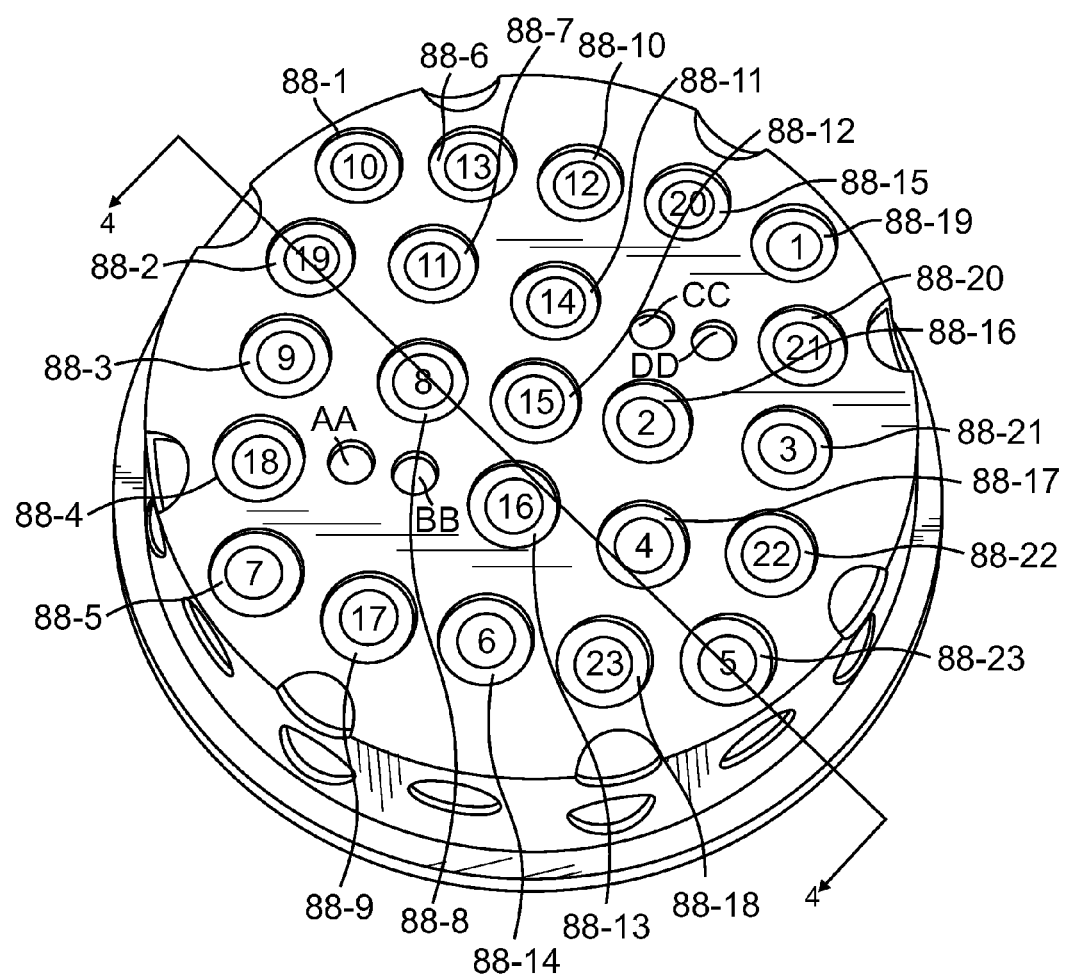
FIG. 3 is a top perspective view from an assembled embodiment of the present invention with the components assembled taken from FIG. 1, illustrating a cover having a multiplicity of openings extending through exterior surfaces of the cover, with a respective assigned number from the indicia assignment member visible through a respective opening in the top surface of the cover, and illustrating the cover attached to the water retaining member.

Referring to FIG. 3, there is illustrated is a top perspective view of the apparatus 10 from an assembled embodiment of the present invention with the components assembled taken from FIG. 1, illustrating a cover 80 having a multiplicity of openings 88 extending through exterior surfaces of the cover, with a respective assigned number 66 from the indicia assignment member 60 visible through a respective opening 88 in the top surface 82 of the cover 80, and illustrating the cover 80 attached to the water retaining member 60.

Figure 4:
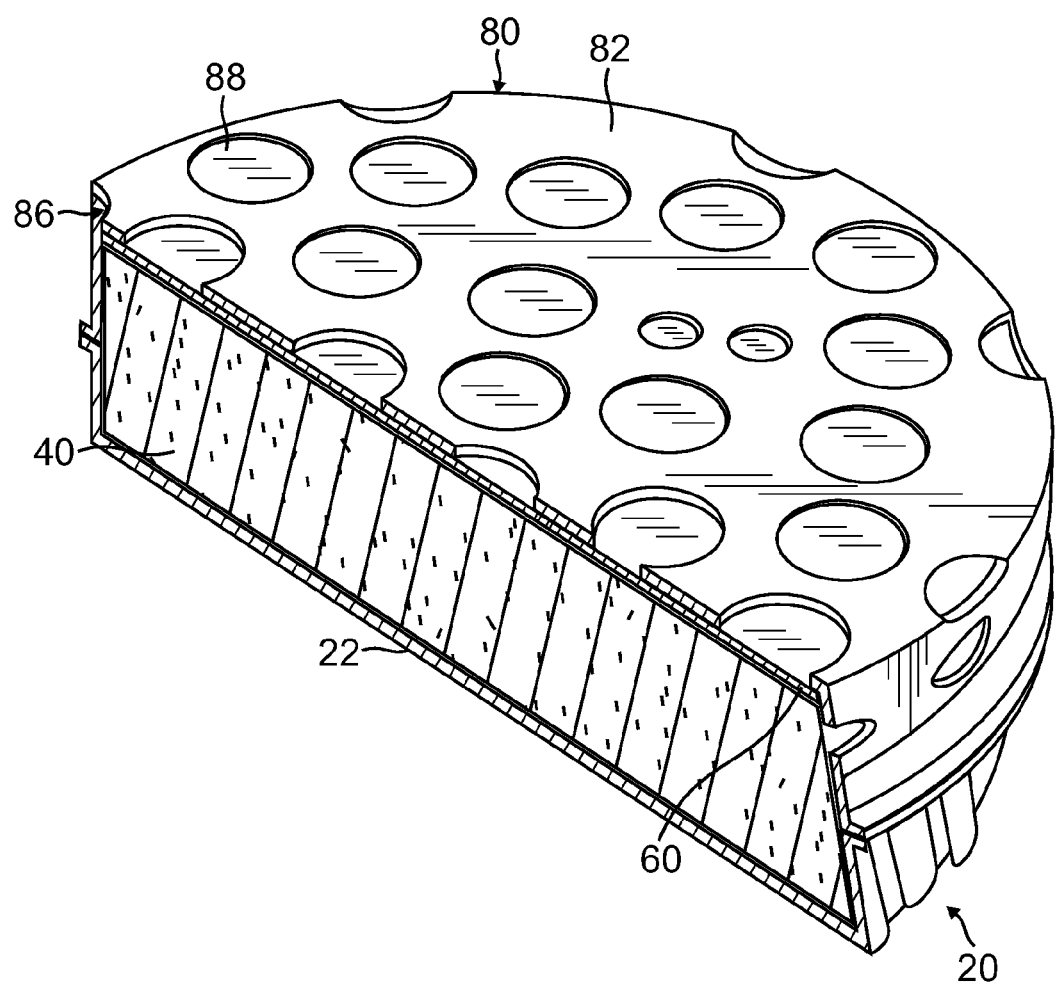
FIG. 4 is a cross-sectional view taken along line 4-4 of FIG. 3 when the components from the exploded view of FIG. 1 are assembled, illustrating a water retaining member and closed by a cover having a multiplicity of openings extending through exterior surfaces of the cover, with the water retention and stem retaining member partially within the water retaining member partially within the cover and the indicia assignment member between the water retaining member and the cover, with a respective assigned number from the number assignment member visible through a respective opening in the top surface of the cover.

FIG. 4 is a cross-sectional view taken along line 4-4 of FIG. 3 wherein the components from the exploded view of FIG. 1 are assembled, illustrating a water retaining member 20 and closed by a cover 80 having a multiplicity of openings 88 extending through the exterior surface of the cover, with the water retention and stem retaining member 40 partially within the interior chamber 32 of water retaining member 20 and partially within the cover 80 and the indicia assignment member 60 between the top surface 42 of the water retention and stem retaining member 40 and the interior surface 86 of the top 82 of cover 80, with a respective assigned number 66 from the number assignment member 60 visible through a respective opening 88 in the top surface 82 of the cover 80.

Figure 5:
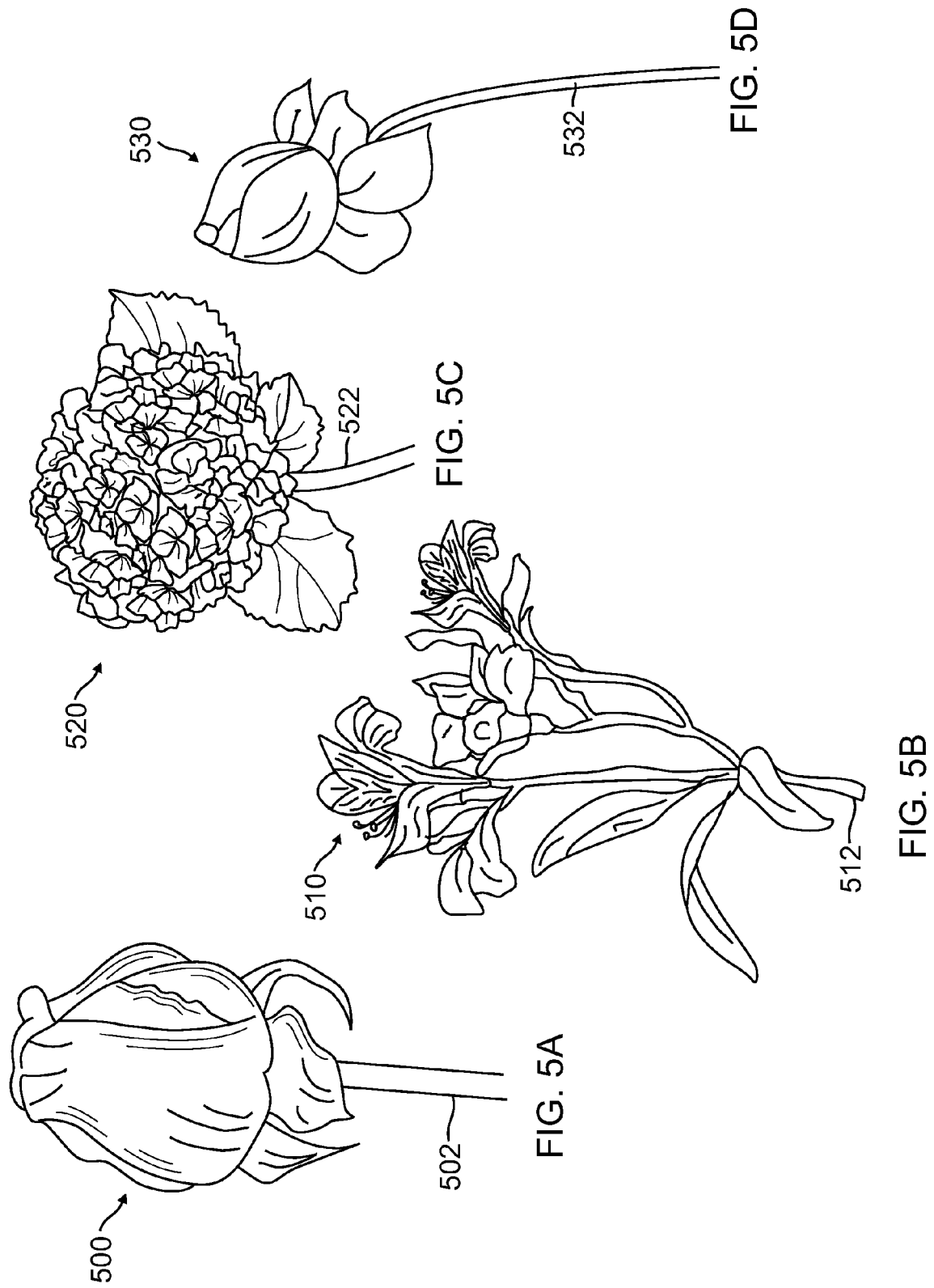
FIG. 5A is a side perspective view of a flower and attached stem cut from a living plant, where the flower is a tulip.
FIG. 5B is a side perspective view of a flower and attached stem cut from a living plant, where the flower is a lily.
FIG. 5C is a side perspective view of a flower and attached stem cut from a living plant, where the flower is a peony.
FIG. 5D is a side perspective view of a flower and attached stem cut from a living plant, where the flower is a rose.

FIG. 5A is a side perspective view of a flower 500 and attached stem 502 cut from a living plant, where the flower 500 is a tulip.

FIG. 5B is a side perspective view of a flower 510 and attached stem 512 cut from a living plant, where the flower 510 is a lily.

FIG. 5C is a side perspective view of a flower 520 and attached stem 522 cut from a living plant, where the flower 520 is a peony.

FIG. 5D is a side perspective view of a flower 530 and attached stem 532 cut from a living plant, where the flower 532 is a rose.

In operation, the interior chamber 32 of water retention member 20 is partially filled with water, the water retention and stem retaining member 40 is placed into the interior 32, the indicia assignment member 60 is placed onto the top surface 42 of water retention and stem retaining member 40 and positioned through the indicia marker 62 so that an assigned indicia 66 is aligned with a corresponding opening 88 in the cover 80 and the cover 80 affixed onto the water retention member 40 so that a respective indicia is visible through an opening 88 in the cover 80. Before the cover 80 is affixed onto the water retention member, the chamber 32 is filled with enough water so that the water retention and stem retaining member has absorbed sufficient water to enable a stem cut from a living plant to have enough water to keep the flower to which the stem is attached to be alive for as long as possible.

It is within the spirit and scope of the present invention for the water retention and stem retaining member to be of any size and shape to conform to the base into which it is placed, and the cover. The water retention and stem retaining material, preferably water retaining foam, is conventionally referred to as an oasis.

It is also within the spirit and scope of the present invention for the indicia assignment member to be made of any material selected from the group consisting of paper, cardboard, plastic and metal onto which indicia and indicia markers are visibly retained by any desired method selected from the group consisting of written, printed, stamped, and molded. The indica are selected from the group consisting of numbers, letters in any language, symbols, flags, and any other graphic image, each in any color or colors, and each in any selected multiplicity which are entirely different or in selected subgroups with each subgroup have the same indicia such as the number 20, and any combination or subcombination such as numbers and at least one graphic image.

The water retaining member can be any shape such as cylindrical as illustrated in FIGS. 1 and 4 or any other physical shape including a vase, and urn, a pot, etc. which has a water retaining chamber, preferably leakproof.

Included in the present invention is any multiplicity of indicia instructions selected from the group consisting of a printed sheet, booklet, wrapping around the water retaining member, website and any downloadable computer application downloadable in an electronic device including a tablet, smartphone, laptop, computer, and monitor. The indicia instruction provides any multiplicity of indicia assignments to a flower and stem cut from a living plant, with indicia such as a number or symbol assigned to a flower such as a rose. The instructions correspond to the indicia on the selected indicia assignment member so that a particular flower and indicia advise the selection of the flower to be placed into a floral arrangement so that the stem of the flower is pushed through the indicia assignment member at the location of the indicia corresponding to the flower, the stem pushed into and retained in the water retention and stem retaining member. The process is repeated for different flowers assigned to different indicia until the desired floral arrangement is completed.

The indicia assignment member 60 can be placed over any location of the water retention and stem retaining member 40 where the indicia 66 is visible through an opening in the cover 80. By having the indicia on an indicia assignment member, the indicia is clearly visible.

FIGS. 1 through 4 illustrate one embodiment of the present invention. FIGS. 5A, 5B, 5C and 5D illustrate some of the flowers. Other items such as vines and other floral members can be inserted into side openings in the cover to conceal portions of the apparatus 10. Other openings such as AA, BB, CC and DD can be in the cover to facilitate a post inserted into the water retention and stem retaining member, the post affixed to different items such as a card, an occasion ornament such as a heart, rabbit, Santa Claus, Jack O'Lantern, etc.

Figure 6:
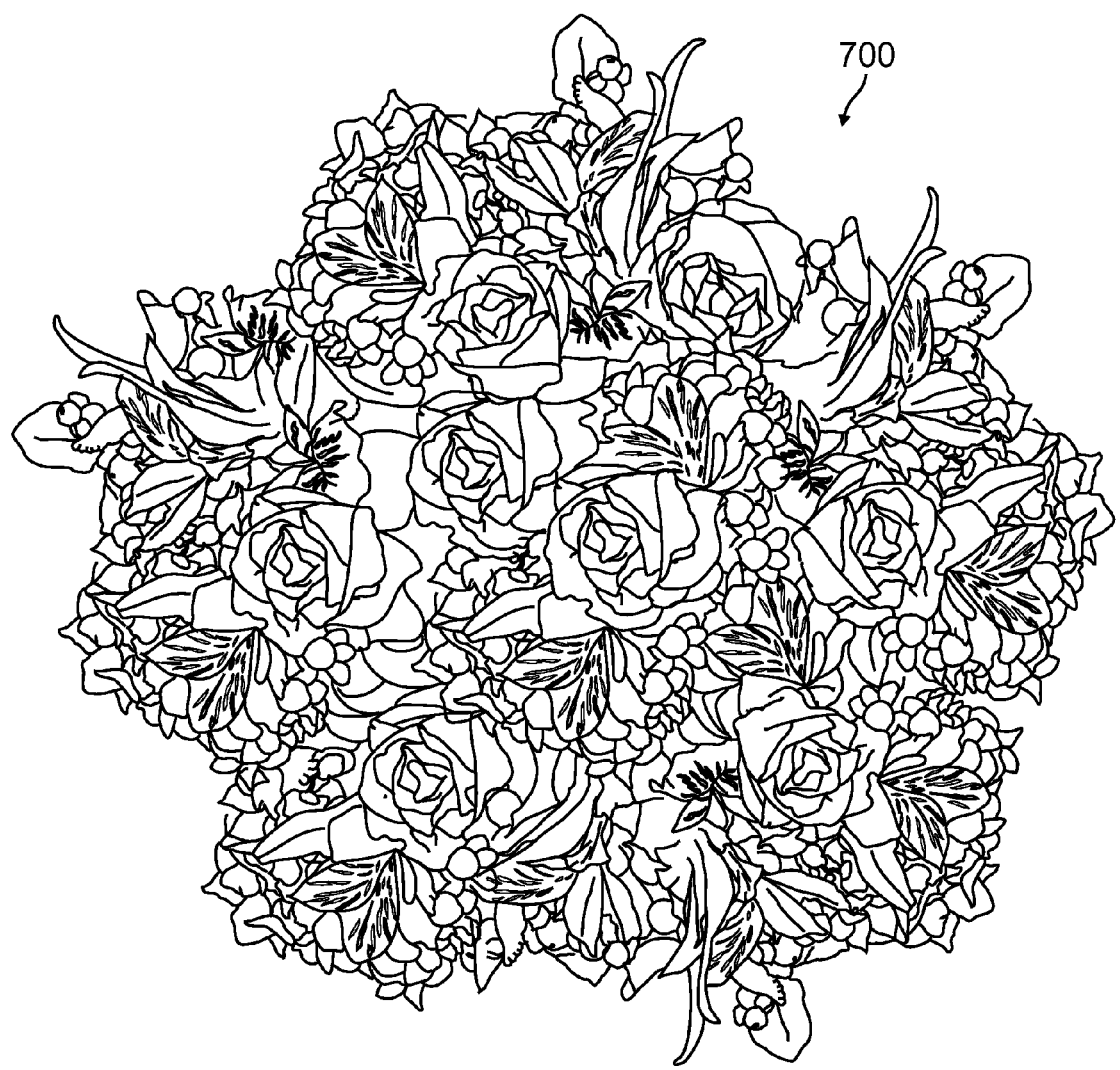
FIG. 6 is a top plan view of a completed floral arrangement utilizing the present invention.

An example of a completed floral arranged 700 created through the present invention is illustrated in FIG. 6.

One alternative embodiment of the present invention is illustrated in FIGS. 7 through 10.

Figure 7:
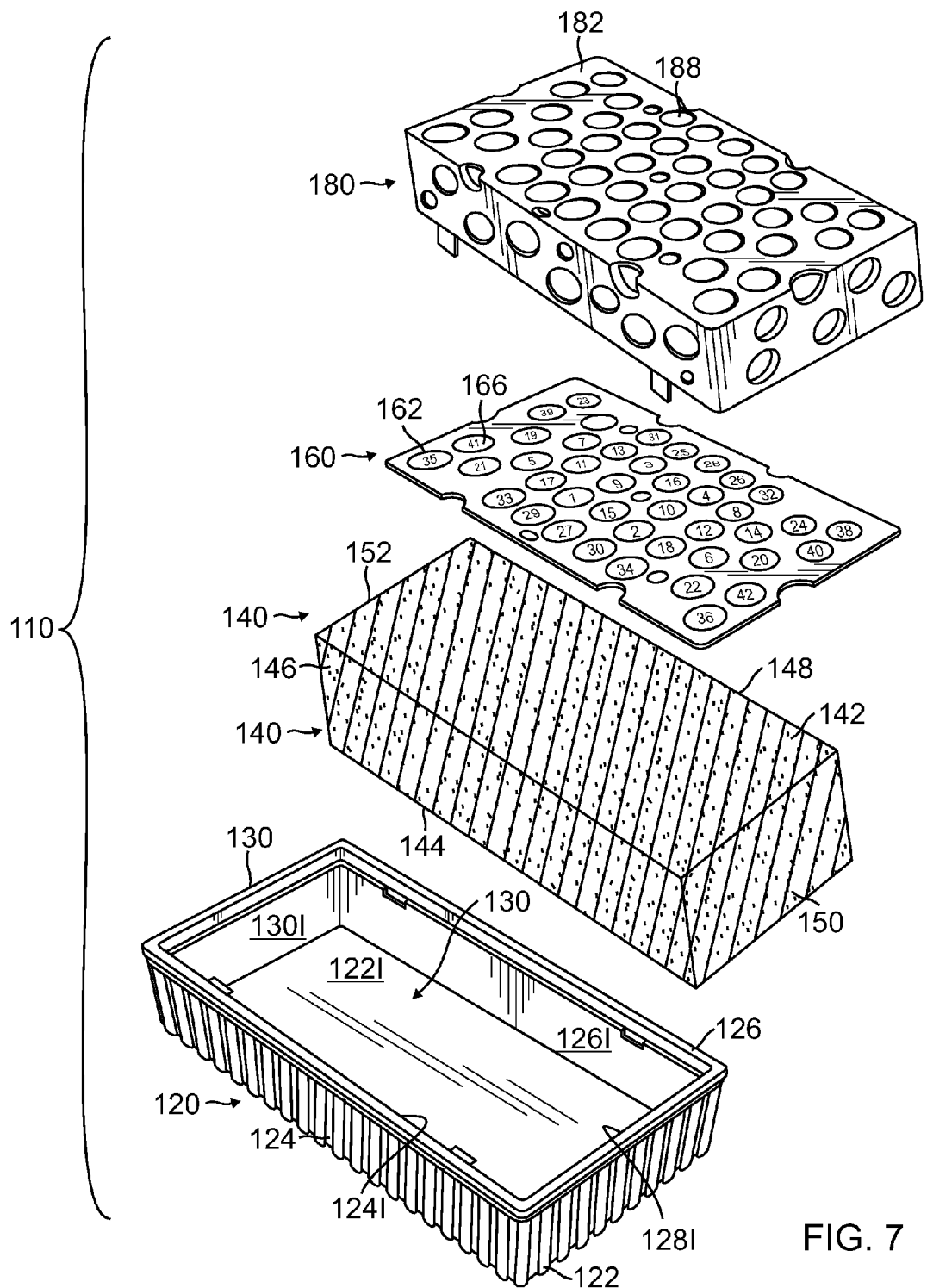
FIG. 7 is an exploded view of another embodiment of the present invention illustrating a water and retaining member, a water retention and stem retaining member, a corresponding indicia assignment member and a cover having a multiplicity of openings to enable an assigned indicia from the indicia assignment member to be visible.

FIG. 7 is an exploded view of an alternative embodiment of the present invention apparatus for creating decorative floral arrangements 110 illustrating a water and retaining member 120, a water retention and stem retaining member 140, a corresponding indicia assignment member 160 and a cover 180 having a multiplicity of openings extending through top surface 182 to enable a respective indicia 166 which in the illustration are numbers to be visible through a respective opening 188 in the top surface 182 of the cover 180, each respective one of the multiplicity of openings extending through the cover 180. To facilitate correct placement of the indicia assignment member, an indicia marker 162 such as a circle is placed around each indicia 166.

In the illustration in FIGS. 7 to 10, the openings are in the top of the cover 180, extending through the entire thickness of the cover 180 from the top surface 182 to the bottom surface 186. A general number for the openings is 188. The indicia are generally numbered 166. In the illustration in FIGS. 7 through 10, a corresponding opening 188 is aligned with corresponding to a respective indicia 166 each respectively encircled by an indicia marker 162 is as follows:

Opening 188-1 is aligned with number 35, opening 188-2 is aligned with number 41, opening 188-3 is aligned with number 39, opening 188-4 is aligned with number 37, opening 188-5 is aligned with number 21, opening 188-6 is aligned with number 19, opening 188-7 is aligned with number 23, opening 188-8 is aligned with number 5, opening 188-9 is aligned with number 7, opening 188-10 is aligned with number 33, opening 188-11 is aligned with number 17, opening 188-12 is aligned with number 11, opening 188-13 is aligned with number 13, opening 188-14 is aligned with number 31, opening 188-15 is aligned with number 29, opening 188-16 is aligned with number 1, opening 188-17 is aligned with number 9, opening 188-18 is aligned with number 3, opening 188-19 is aligned with number 25, 188-20 is aligned with number 27, opening 188-21 is aligned with number 15, opening 188-22 is aligned with number 16, opening 188-23 is aligned with number 28, opening 188-24 is aligned with number 30, opening 188-25 is aligned with number 2, opening 188-26 is aligned with number 10, opening 188-27 is aligned with number 4, opening 188-28 is aligned with number 26, opening 188-29 is aligned with number 34, opening 188-30 is aligned with number 18, opening 188-31 is aligned with number 12, opening 188-32 is aligned with number 8, opening 188-33 is aligned with number 32, opening 188-34 is aligned with number 6, opening 188-35 is aligned with number 14, opening 188-36 is aligned with number 22, opening 188-37 is aligned with number 20, opening 188-38 is aligned with number 24, opening 188-39 is aligned with number 36, opening 188-40 is aligned with number 42, opening 188-41 is aligned with number 38.

For the embodiment illustrated in FIGS. 7 to 10, the water retaining member 120 is a container bottom having a bottom wall 122 with an interior surface 122I, and a circumferential wall with a first lengthwise sidewall 124 with an interior surface 124I, a second lengthwise sidewall 126 with an interior surface 126I, a first width-wise end-wall 128 with an interior surface 128I, and a second width-wise end-wall 130 with an interior surface 130I which together form a rectangular shaped container bottom surrounding an interior water tight or leakproof chamber 132.

The water retention and stem retaining member 140 is a rectangular block having a top surface 142, a bottom surface 144, and a circumferential wall with a first lengthwise sidewall 146, a second lengthwise sidewall 148. a first width-wise end-wall 150, and a second width-wise end-wall 152. The water retention and stem retaining member 140 is preferably made of water absorbing foam which is also known as an oasis. The foam has a memory so that when a stalk of a flower is caused to penetrate into the foam, the foam retains the stalk and the opening remains even if the stalk is removed.

Figure 8:
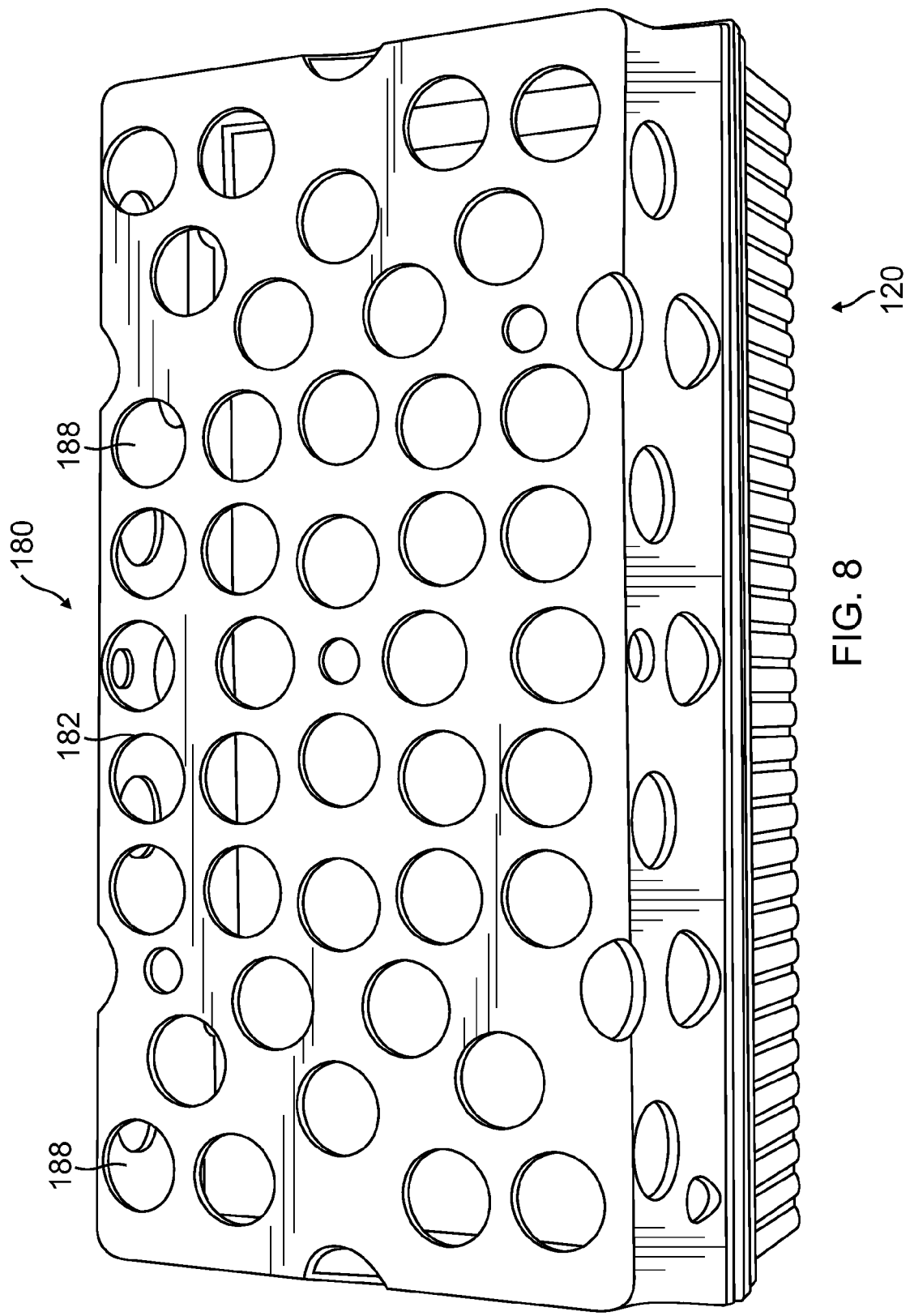
FIG. 8 is a top perspective view of a cover of an alternative embodiment with a multiplicity of openings extending through surfaces of the cover.

Referring to FIG. 8, there is illustrated a top perspective view of the assembled apparatus 110 illustrating cover 180 with a multiplicity of openings 188, and the water retaining member 120.

Figure 9:
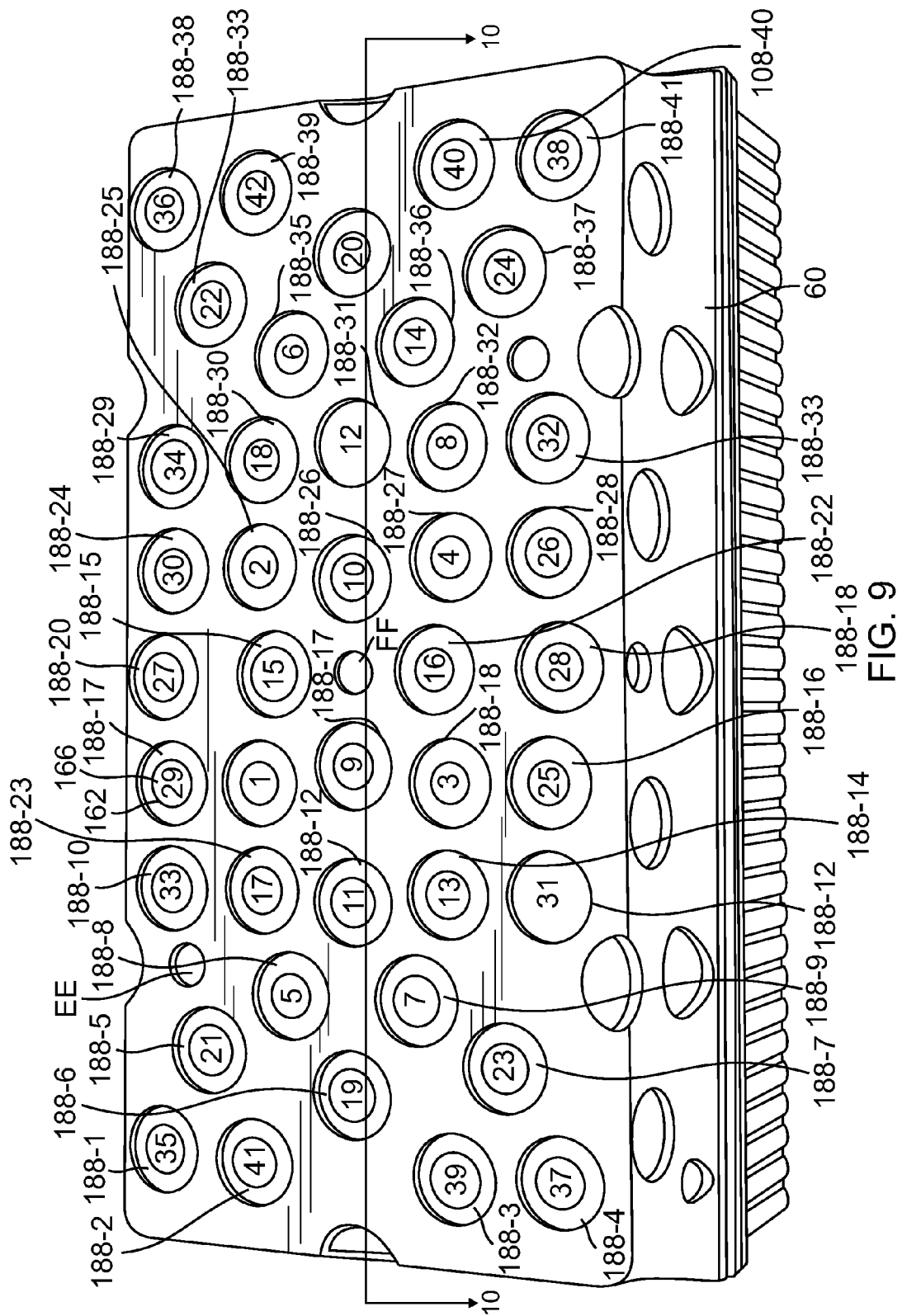
FIG. 9 is a top perspective view from an assembled embodiment of the present invention with the components assembled taken from FIG. 7, illustrating a cover having a multiplicity of openings extending through exterior surfaces of the cover, with a respective assigned number from the indicia assignment member visible through a respective opening in the top surface of the cover, and illustrating the cover attached to the water retaining member.

Referring to FIG. 9, there is illustrated is a top perspective view of the apparatus 110 from an assembled alternative embodiment of the present invention with the components assembled taken from FIG. 7, illustrating a cover 180 having a multiplicity of openings 188 extending through exterior surfaces of the cover, with a respective assigned number 166 from the indicia assignment member 160 visible through a respective opening 188 in the top surface 182 of the cover 180, and illustrating the cover 180 attached to the water retaining member 160.

Figure 10:
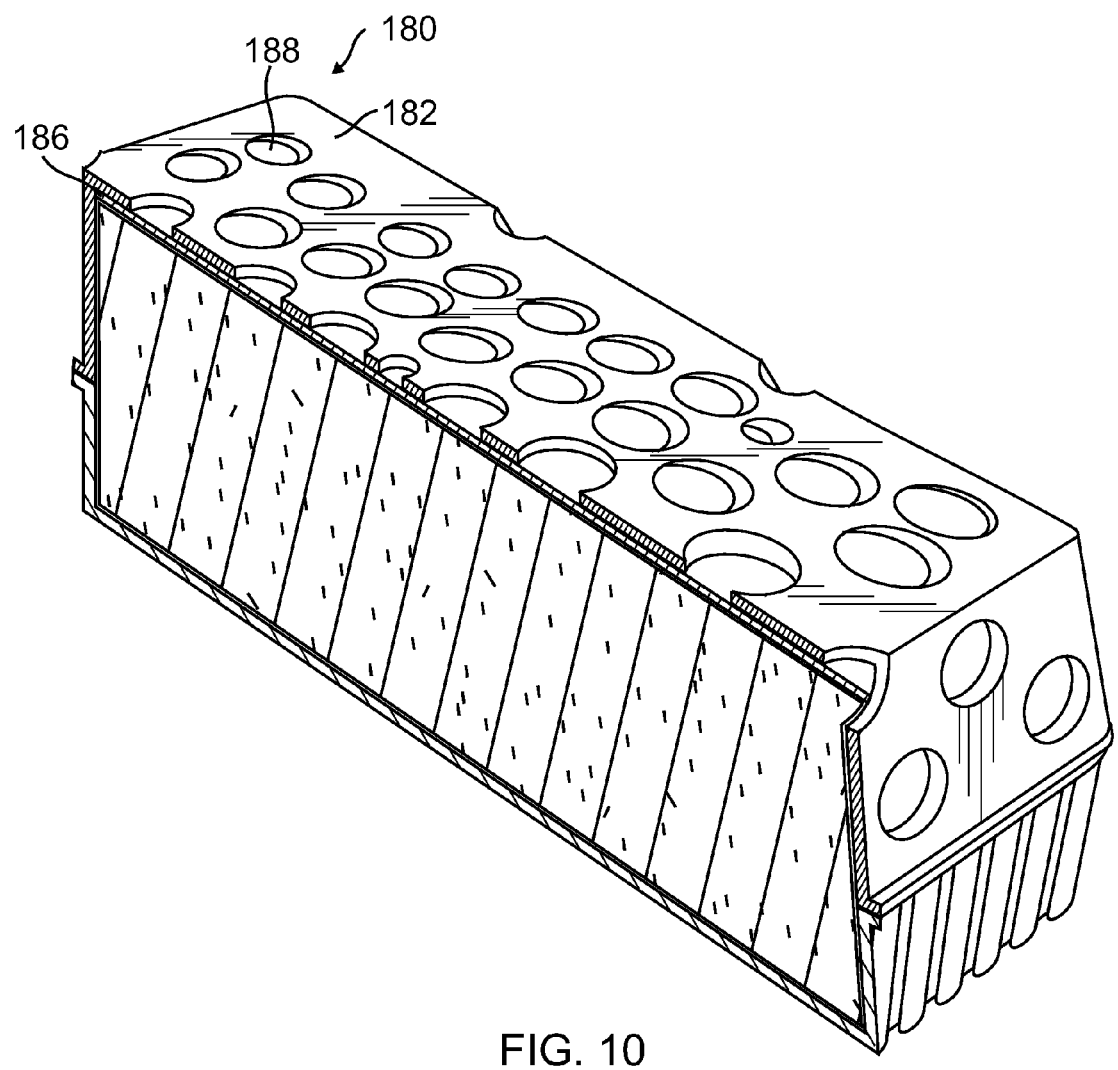
FIG. 10 is a cross-sectional view taken along line 10-10 of FIG. 9 when the components from the exploded view of FIG. 7 are assembled, illustrating a water retaining member and closed by a cover having a multiplicity of openings extending through exterior surfaces of the cover, with the water retention and stem retaining member partially within the water retaining member partially within the cover and the indicia assignment member between the water retaining member and the cover, without illustrating the indicia.

FIG. 10 is a cross-sectional view taken along line 10-10 of FIG. 9, wherein the components from the exploded view of FIG. 7 are assembled, illustrating a water retaining member 120 and closed by a cover 180 having a multiplicity of openings 188 extending through exterior surface of the cover, with the water retention and stem retaining member 140 partially within the interior chamber 132 of water retaining member 120 and partially within the cover 180 and the indicia assignment member 160 between the top surface 142 of the water retention and stem retaining member 140 and the interior surface 186 of the top 184 of cover 180, with a respective assigned number 166 from the number assignment member 160 visible through a respective opening 188 in the top surface 182 of the cover 180.

In operation, the interior chamber 132 of water retention member 120 is partially filled with water, the water retention and stem retaining member 140 is placed into the interior 132, the indicia assignment member 160 is placed onto the top surface 142 of water retention and stem retaining member 140 and positioned through the indicia markers 162 so that an assigned indicia 166 is aligned with a corresponding opening 188 in the cover 180 and the cover 180 affixed onto the water retention member 140 so that a respective indicia is visible through an opening 184 in the cover 180. Before the cover 180 is affixed onto the water retention member 120, the chamber 132 is filled with enough water so that the water retention and stem retaining member 140 has absorbed sufficient water to enable a stem cut from a living plant to have enough water to keep the flower to which the stem is attached to be alive for as long as possible.

It is within the spirit and scope of the present invention for the water retention and stem retaining member to be of any size and shape to conform to the base into which it is placed, and the cover, The water retention and stem retaining material, preferably water retaining foam, is conventionally referred to as an oasis.

It is also within the spirit and scope of the present invention for the indicia assignment member to be made of any material selected from the group consisting of paper, cardboard. plastic and metal onto which indicia and indicia markers are visibly retained by any desired method selected from the group consisting of written, printed, stamped, and molded. The indica are selected from the group consisting of numbers, letters in any language, symbols, flags, and any other graphic image, each in any color or colors, and each in any selected multiplicity which are entirely different or in selected subgroups with each subgroup have the same indicia such as the number 35, and any combination or subcombination such as numbers and at least one graphic image.

The water retaining member can be any shape such as cylindrical as illustrated in FIGS. 1 and 4 or any other physical shape including a vase, an urn, a pot, etc. which has a water retaining chamber, preferably leakproof.

Included in the present invention is any multiplicity of indicia instructions selected from the group consisting of a printed sheet, booklet, wrapping around the water retaining member, website and any downloadable computer application downloadable in an electronic device including a tablet, smartphone, laptop, computer, and monitor. The indicia instruction provides any multiplicity of indicia assignments to a flower and stem cut from a living plant, with indicia such as a number or symbol assigned to a flower such as a rose. The instructions correspond to the indicia on the selected indicia assignment member so that a particular flower and indicia advise the selection of that flower to be placed into a floral arrangement so that the stem of the flower is pushed through the indicia assignment member at the location of the indicia corresponding to the flower, the stem pushed into and retained in the water retention and stem retaining member. The process is repeated for different flowers assigned to different indicia until the desired floral arrangement is completed.

The indicia assignment member 160 can be placed over any location of the water retention and stem retaining member 40 where the indicia 66 is visible through an opening in the cover 80. By having the indicia on an indicia assignment member, the indicia is clearly visible.

FIGS. 7 through 10 illustrate one alternative embodiment of the present invention. FIGS. 5A, 5B, 5C and 5D illustrate some of the flowers. Other items such as vines and other floral members can be inserted into side openings in the cover to conceal portions of the apparatus 10. Other openings such as EE, FF and GG can be in the cover to facilitate a post inserted into the water retention and stem retaining member, the post affixed to different items such as a card, an occasion ornament such as a heart, rabbit, Santa Claus, Jack O'Lantern, etc.

Figure 11:
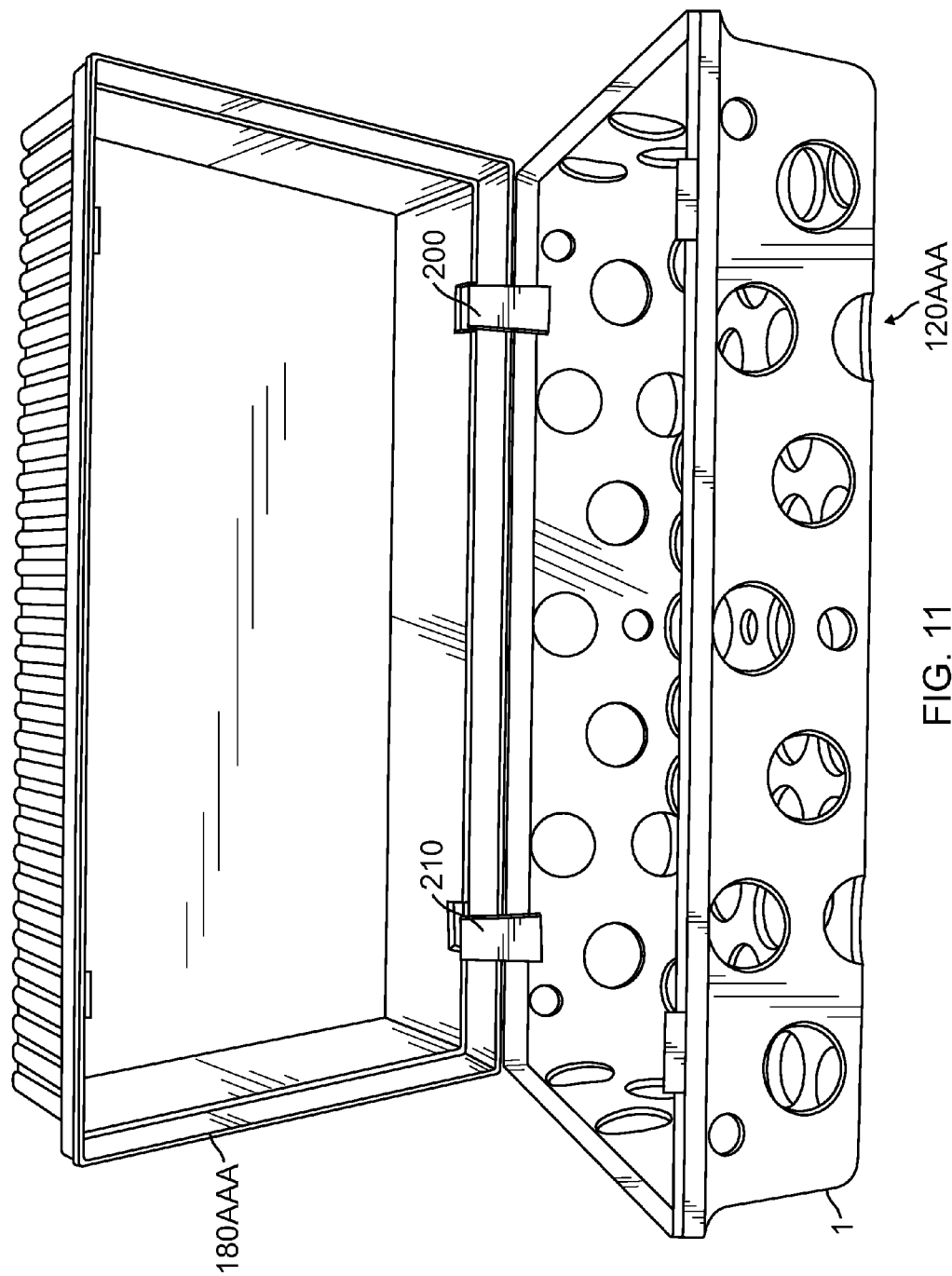
FIG. 11 is an open perspective view of an alternative embodiment of the present invention illustrating a cover having a multiplicity of openings extending through exterior surfaces of the cover and attached to a water retention member.

Another alternative embodiment of the present invention is illustrated in FIG. 11. The water retaining member 120AAA is comparable to the water retaining member 120 illustrated in FIGS. 7 to 10 and the cover 180AAA is comparable to the cover 180 illustrated in FIGS. 7 to 10. The variation is spaced apart clip attachment members 200 and 210 affixed to a side of cover 180AAA which enable the cover 180AAA to be attached to the water retaining member 120AAA.

It will appreciated that it is within the spirit and scope of the present invention for the cover and water retaining member to be attached together by any attachment member or the cover can simply be placed onto the water retaining member.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus to create a floral arrangement, comprising:
    a. a water retaining member including an interior chamber;
    b. a water retention and stem retaining member;
    c. a number assignment member having a top surface with a multiplicity of spaced apart numbers and a multiplicity of number markers with a respective number marker respectively encompassing a respective one of the numbers from the multiplicity of spaced apart; numbers;
    d. a cover having a multiplicity of spaced apart openings extending through at least a top of the cover and a bottom surface of the top of the cover, the cover having an interior chamber;
    e. the number assignment member positioned on an upper surface of the water retention and stem retaining member, a portion of the water retention and stem retaining member positioned within the chamber of the water retaining member, a portion of the water retention and stem retaining member positioned within the chamber of the cover, the number assignment member positioned within the chamber of the cover, the cover positioned on the number assignment member with the number assignment member press fit retained against the bottom surface of the top of the cover, a corresponding one of the multiplicity of spaced apart numbers on the number assignment member aligned with and visible through a respective one of the multiplicity of spaced apart openings in at least the top of the cover;
    f. the cover and the water retaining member are in direct contact and touch each other and are retained together with respective engaging members to retain the cover in a fixed manner onto the water retaining member;
    g. the apparatus used in conjunction with water and a multiplicity of live cut flowers, and water retained in the water retaining member and partially absorbed by the water retention and stem retaining member, each respective live cut flower from the multiplicity of live cut flowers including a stem obtained from a living plant, each number respectively corresponding with a respective cut flower and stem to facilitate a stem of a cut flower with a corresponding number inserted through an aligned opening in the cover and aligned visible corresponding number of the number assignment member and inserted into and retained by the water retention and stem retaining member to create the floral arrangement; and
    h. the press fit engagement of the number assignment member against the bottom surface of the top prevents the floral arrangement from moving or wiggling when the floral arrangement is transported from one location to another.

2. The apparatus to create a floral arrangement in accordance with claim 1, further comprising: the number assignment member is made of material selected from the group of consisting of paper, cardboard, plastic and metal.

3. The apparatus to create a floral arrangement in accordance with claim 2, further comprising: the numbers and number markers are visibly retained on the number assignment member by having the each number and each number marker written, printed, stamped, or molded to the number assignment member.

4. The apparatus to create a floral arrangement in accordance with claim 1, further comprising: each number is in a selected color.

5. The apparatus to create a floral arrangement in accordance with claim 1, further comprising: any portion of a selected multiplicity of numbers are in sub-groups on the number assignment member.

6. The apparatus to create a floral arrangement in accordance with claim 1, further comprising: the multiplicity of number markers are round.

7. The apparatus to create a floral arrangement in accordance with claim 1, further comprising: the water retention and stem retaining member is made of water absorbing foam.

8. The apparatus to create a floral arrangement in accordance with claim 1, further comprising: the water retaining member and cover are each cylindrical in shape.

9. The apparatus to create a floral arrangement in accordance with claim 1, further comprising: the water retaining member and cover are each rectangular in shape.

10. The apparatus to create a floral arrangement in accordance with claim 1, further comprising number instructions, wherein the number instructions are selected from the group consisting of a printed sheet, booklet, wrapping around the water retaining member, a website and a downloadable computer application downloadable in an electronic device selected from the group consisting of a tablet, smartphone, laptop, computer, and monitor.

11. The apparatus to create a floral arrangement in accordance with claim 1, further comprising:

a. the water retaining member is a container bottom having a bottom wall with an interior surface, a first lengthwise sidewall with an interior surface, a second lengthwise sidewall with an interior surface and a first transverse end wall with an interior surface and a second transverse end wall with an interior surface, which together form a rectangular shaped container bottom surrounding the interior chamber;
b. the water retention and stem retaining member is a block having a top surface, a bottom surface, a first lengthwise surface, a second lengthwise surface, a first transverse end surface and a second transverse end surface;
c. the number assignment member is a rectangular shaped sheet of material; and
d. the cover having a top wall with an interior surface, a first lengthwise sidewall with an interior surface, a second lengthwise sidewall with an interior surface, a first transverse end wall with an interior surface and a second transverse end wall with an interior surface, which together form a rectangular shaped cover.

12. The apparatus to create a floral arrangement in accordance with claim 1, further comprising:
a. the water retaining member is a container bottom having a bottom wall with an interior surface, and a circumferential sidewall with an interior surface, which together form a cylindrical shaped container bottom surrounding the interior chamber;
b. the water retention and stem retaining member is a cylindrical block having a top surface, a bottom surface, and a circumferential side surface;
c. the number assignment member is a round shaped sheet of material; and
d. the cover having a top wall with an interior surface, and a circumferential sidewall with an interior surface which together form a cylindrical shaped cover.

13. The apparatus to create a floral arrangement in accordance with claim 1, further comprising: the cover further includes a multiplicity of second openings to receive additional foliage to conceal the water retaining member.

14. The apparatus to create a floral arrangement in accordance with claim 1, further comprising: the cover is attached to the water retaining member by attachment members.

15. An apparatus to create a floral arrangement, comprising:
a. a water retaining member including an interior chamber;
b. a water retention and stem retaining member;
c. an number assignment member having a top surface with a multiplicity of spaced apart indicia;
d. a cover member having a multiplicity of spaced apart openings extending through at least a top of the cover, the cover having an interior chamber;
e. the number assignment member positioned on an upper surface of the water retention and stem retaining member, a portion of the water retention and stem retaining member positioned within the chamber of the water retaining member, a portion of the water retention and stem retaining member positioned within the chamber of the cover, the number assignment member positioned within the chamber of the cover, the cover positioned on the number assignment member with the number assignment member press fit retained against the bottom surface of the top of the cover, a corresponding one of the multiplicity of spaced apart numbers on the number assignment member aligned with and visible through a respective one of the multiplicity of spaced apart openings in at least the top of the cover;
f. the cover and the water retaining member are in direct contact and touch each other and are retained together with respective engaging members to retain the cover in a fixed manner onto the water retaining member; and
g. the apparatus used in conjunction with water and a multiplicity of cut flowers, water retained in the water retaining member and partially absorbed by the water retention and stem retaining member, each respective cut flower from the multiplicity of cut flowers including a stem obtained from a living plant, each indicia respectively corresponding with a respective cut flower and stem to facilitate a stem of a cut flower with a corresponding indicia inserted through an aligned opening in the cover and aligned visible corresponding indicia of the indicia assignment member and inserted into and retained by the water retention and stem retaining member to create the floral arrangement.

* * * * *